US007813745B2

(12) United States Patent
Li

(10) Patent No.: US 7,813,745 B2
(45) Date of Patent: Oct. 12, 2010

(54) METHOD FOR IMPLEMENTING A PUSH SERVICE

(75) Inventor: Ronggao Li, Guangdong Province (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 658 days.

(21) Appl. No.: 10/586,230

(22) PCT Filed: Apr. 7, 2006

(86) PCT No.: PCT/CN2006/000625

§ 371 (c)(1),
(2), (4) Date: Jul. 18, 2006

(87) PCT Pub. No.: WO2006/114038

PCT Pub. Date: Nov. 2, 2006

(65) Prior Publication Data

US 2008/0233979 A1 Sep. 25, 2008

(30) Foreign Application Priority Data

Apr. 26, 2005 (CN) ........................ 2005 1 0068110

(51) Int. Cl.
*H04W 4/00* (2009.01)
(52) U.S. Cl. ........................ 455/466; 370/473; 370/474
(58) Field of Classification Search .............. 455/412.1, 455/412.2, 413, 414.1, 414.2, 414.3, 466, 455/560; 370/473–476, 389, 394, 401, 471; 709/204, 206, 217, 218, 230
See application file for complete search history.

(56) References Cited

U.S. PATENT DOCUMENTS 6,138,158 A * 10/2000 Boyle et al. ................ 709/225

| | | | | |
|---|---|---|---|---|
| 6,928,290 | B2 * | 8/2005 | Byers et al. | 455/455 |
| 6,947,743 | B2 * | 9/2005 | Aitken et al. | 455/432.2 |
| 7,043,264 | B2 * | 5/2006 | Vance et al. | 455/466 |
| 7,089,024 | B2 * | 8/2006 | Kim et al. | 455/466 |
| 7,299,050 | B2 * | 11/2007 | Delaney et al. | 455/445 |
| 7,299,349 | B2 * | 11/2007 | Cohen et al. | 713/150 |
| 2004/0235503 | A1 * | 11/2004 | Koponen et al. | 455/466 |
| 2004/0254993 | A1 * | 12/2004 | Mamas | 709/206 |

(Continued)

FOREIGN PATENT DOCUMENTS

CN 1422040 6/2003

(Continued)

OTHER PUBLICATIONS

Chinese Office Action issued for Application No. 2005100709493, dated Apr. 24, 2008.

*Primary Examiner*—Anthony S. Addy

(57) ABSTRACT

This invention provides a method for implementing a Push service, which is used to solve the problems of low delivery success rate and relatively long time delay. The method includes the following steps: a Push Initiator (PI) submitting a Push message to a Push Proxy Gateway (PPG); the PPG sending the Push message to a Short Message Service Center (SMSC); the SMSC segmenting the Push message according to the Push content to obtain a group of short messages, and scheduling the group of short messages in a transaction mode and delivering them to a mobile station; after receiving the group of the short messages, the mobile station recombining them to show the Push message. This invention can improve the delivery success rate of a Push message.

3 Claims, 2 Drawing Sheets

U.S. PATENT DOCUMENTS

2005/0002407 A1* 1/2005 Shaheen et al. ............. 370/401
2005/0169285 A1* 8/2005 Wills et al. .................. 370/401
2006/0084451 A1* 4/2006 Garnero et al. .............. 455/466
2006/0199597 A1* 9/2006 Wright ....................... 455/466

FOREIGN PATENT DOCUMENTS

| JP | 2004282429 | 10/2004 |
|---|---|---|
| KR | 2004086963 | 10/2004 |
| KR | 2005006694 | 1/2005 |

* cited by examiner

METHOD FOR IMPLEMENTING A PUSH SERVICE

RELATED APPLICATIONS

This application is the national phase application of International Application No. PCT/CN2006/000625, filed Apr. 7, 2006, which claims the benefit of Chinese Application No. 200510068110.2, filed Apr. 26, 2005. The entire disclosure of each of the prior applications is hereby incorporated by reference.

FIELD OF THE INVENTION

The present invention relates to the field of communication, and more specifically, to a method for implementing a Push service.

BACKGROUND OF THE INVENTION

A Push service is a kind of service of "pushing" information to a subscriber, initiated by a server on its own initiative. A system for implementing a Push service includes three entities: a Push Initiator (PI), a Push Proxy Gateway (PPG) and a Push receiver. Among them, the PI is used to send Push content to the PPG, Push instructions being contained in the Push content; the PPG is used to deliver the content to the Push Receiver according to the Push instructions. As shown in FIG. 1, taking example for WAP Push, the PI is located within the Internet and communicates with the PPG using a Push Access Protocol (PAP); the PPG is an access point between the Internet and a mobile network, which pushes messages to the Push receiver, i.e. the mobile station, using a Push OTA (Over-The-Air) protocol.

The flow of implementing a Push service can be described as follows.

A. The PI pushes a message to the PPG: when the PI detecting there is a message needs to be pushed to the mobile station, the PI first constructing a Push message according to the content and nature of the message, and sending a Push request to the PPG using the PAP.

B. The PPG processes the Push message: after receiving the request, the PPG performing some necessary processing including compression, protocol conversion, security authentication and so on, and then transferring the Push message to the mobile station using the OTA protocol.

C. The mobile station processes the received Push Message.

When a Push message is to be carried by a short message, for example, when the Push content is to be transferred by a Service Indication (SI), Service Loading (SL) or Multimedia Messaging Service (MMS) notify message, after the Push content has been encoded into a binary code stream in the PPG module of Wireless Application Protocol Gateway (WAP GW), if the total data volume exceeds 140 bytes, it will be spilt into multiple short messages so as to be delivered to the mobile phone. These multiple short messages are scheduled in the Short Message Service Center (SMSC) as common short messages without any relationship thereamong, and at this point, if any one of these multiple short messages is delivered unsuccessfully, the SMSC will schedule and send it over again. Therefore, when these multiple short messages arrive at the mobile station, it is possible that the mobile station can not normally recombine these multiple short messages because of a long time interval, and the transmission of the Push content is thus unsuccessful.

An example of the Push content is an MMS m-notification-ind message. After the MMS m-notification-ind message has been encoded in the PPG, two short messages are needed to carry it, and abnormal delivery of either of the short messages will result in failure in sending of the MMS m-notification-ind message.

In the related art, a Push service is implemented by making use of an SMSC shared with other services to bear a WAP Push message. The flow thereof is shown in FIG. 2.

A1. The Push Initiator (PI)/Multimedia Message Service Center (MMSC) submits a Push message to the PPG.

B1. The PPG returns a response to the Push message.

C1. The PPG resolves the PAP and analyzes the Push message. Because the data volume of a Push message is more than 140 bytes, the PPG segments the Push message, i.e. divides one Push message into multiple short messages and submits them to the SMSC.

D1. The SMSC receives the multiple messages and returns a Submission Response Message to the PPG for each message; the SMSC performs message scheduling for the received messages in a store and forward mode.

E1. The SMSC detects each of the messages, and performs timeout and resend according to a predetermined strategy, i.e. if one of the messages is sent unsuccessfully, the SMSC resends this message according to a resending mechanism; and after the sending has been finished, the SMSC makes and feedbacks a Status Report Message to the PPG.

F1. After receiving the multiple messages, the mobile station recombines them because they belong to one and the same Push message.

The technical solution of implementing Push service by making use of an SMSC shared with other services to bear a WAP Push message may have one or more than one of the following disadvantages.

1. Since it is required to make use of an SMSC shared with other services to bear a WAP Push short message, the SMSC undertakes tasks of transmitting all the short messages, such as a point-to-point short message, a Monternet short message, a WAP Push short message and so on; the SMSC does not distinguish among all the short messages, but performs scheduling in terms of one short message. When the whole network system is relatively busy, once any network element of the wireless network, the No. 7 signaling network is congested, the Push message will be delivered unsuccessfully.

2. The SMSC schedules the short messages in a store and forward mode, and the PPG needs to segment the Push message of more than 140 bytes, thus it will take a relatively long time interval for the multiple segmented Push messages to be delivered to the mobile station, which possibly results in the mobile station unsuccessfully recombining the multiple short messages because of time-out.

3. The Push service has a higher failure rate, which will reduce a subscriber's experience of WAP Push service.

4. The Push service has a longer time delay, which will also reduce a subscriber's experience of WAP Push service.

SUMMARY OF THE INVENTION

A method for implementing a Push service according to an embodiment of the invention includes the following steps:

a Push Initiator (PI) sending a Push message to a Short Message Service Center (SMSC) through a Push Proxy Gateway (PPG);

the SMSC segmenting the Push message to obtain a group of short messages, and scheduling the group of short messages in a transaction mode and delivering them to the mobile station;

after receiving the group of short messages, the mobile station recombining them into an integral message.

The transaction mode refers to continuously sending in a predetermined time a group of short messages obtained by segmenting, and resending one or more of the messages when they are sent unsuccessfully.

If all the short messages of the group obtained by segmenting are sent successfully in a predetermined time, the Short Message Service Center returns an Acknowledgement Message to the PPG, and the PPG sends a Result Notify Message to the Push Initiator according to the Acknowledgement Message.

If any one of the short messages of the group obtained by segmenting is sent unsuccessfully in a predetermined time, the Short Message Service Center returns a Submission Failure Message to the PPG, and the PPG sends a Result Notify message to the Push Initiator according to the Submission Failure Message.

After sending the Push message to the Short Message Service Center, the PPG suspends the present transaction to wait for the processing result thereof from the Short Message Service Center and continues to process the next transaction.

The Short Message Service Center is specially used to bear a Push service.

The Short Message Service Center is arranged separately or integrated in a WAP gateway.

In the invention, there is no need for the PPG to segment a large Push message, and the PPG directly submits a Push message to the SMSC as one message; the SMSC supports a transaction mode and returns an Short Message service (SMS) delivery result to the PPG immediately; the PPG need not to make and submit a status report, which improves the success rate of the Push message. The present invention can also arrange a separate and special SMSC, providing an end-to-end Push service response, which further improves the success rate of the Push message; PUSH adopting an end-to-end service flow reduces the time delay of the Push message.

DETAILED DESCRIPTION OF THE PREFERRED EMBODIMENTS

The invention bears a Push service through an SMSC supporting a transaction mode. When the Push Initiator (PI) detects there is a message needs to be pushed to the mobile station, the PI first constructs a Push message according to the content and nature of the message, and then submits the Push message to the PPG. The PPG does not judge whether the message is of more than 140 bytes and submits the Push message to the SMSC directly. The SMSC segments the Push message into a group of short messages and delivers them to the mobile station when the message is of more than 140 bytes. The SMSC schedules the group of short messages using the transaction mode of the SMPP and delivers them to the mobile station, and directly returns a delivery result to the PPG in a Submission Response Message. Thus the PPG can get the delivery result of the Push message through the Submission Response Message, and there is no need for the SMSC to make a Status Report Message and feedback it to the PPG.

Figure 1:
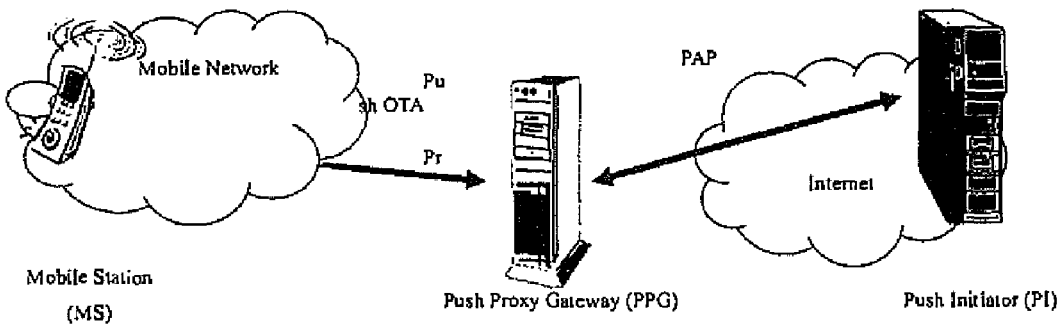
FIG. 1 is a schematic diagram illustrating a system in the related art.
Figure 2:
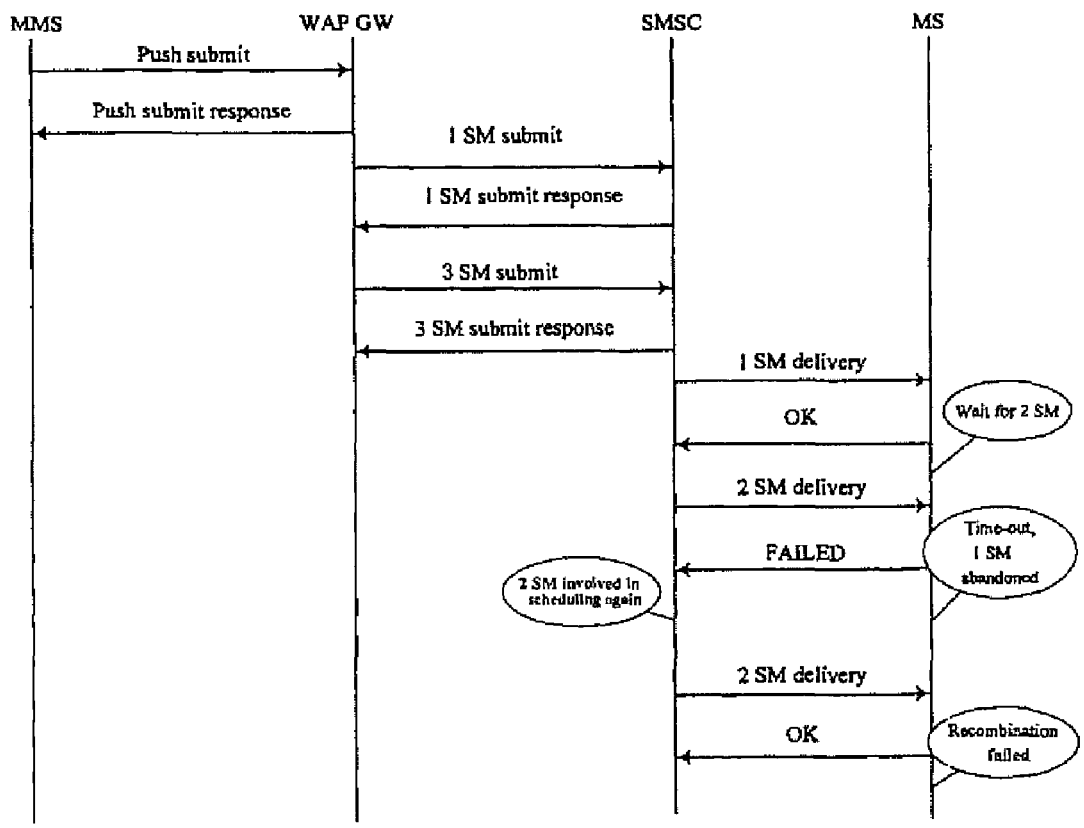
FIG. 2 is a schematic diagram illustrating the flow in the related art.
Figure 3:
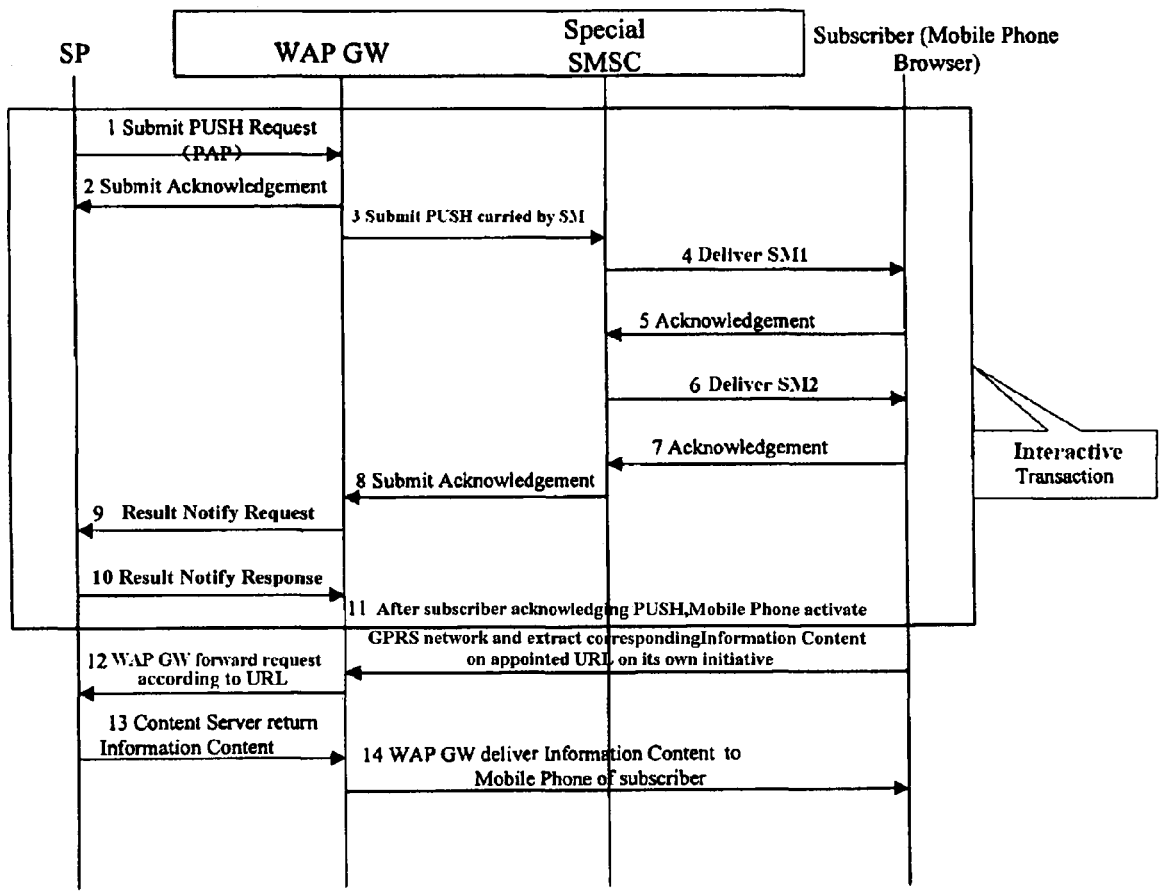
FIG. 3 is a schematic diagram illustrating the flow according to an embodiment of the invention.

In this embodiment, taking example for WAP Push, an SMSC delivers a Push message to a subscriber in an interactive transaction mode, i.e. the Push service can be implemented only after receiving a response from the subscriber. As shown in FIG. 3, the flow is detailed as the following.

1. When the Push Initiator SP detects there is a message needs to be pushed to the mobile station, the SP first constructs a Push message according to the content and nature of the message, and then sends a Push request to the PPG/WAP GW using the PAP.

2. The PPG/WAP GW returns a Submission Acknowledgement Response to the SP.

3. The PPG/WAP GW adopts a real-time mechanism without segmenting the content of the Push message; after bearing the Push message, the PPG/WAP GW submits the Push message to the SMSC and suspends the present transaction to wait for the SMSC to confirm the processing of this transaction; and at the same time, the PPG/WAP GW continues to process the next WAP Push transaction.

4-7. After receiving the Push message, the SMSC segments it to obtain a group of short messages according to the content of the message. As shown in the figure, the Push message is segmented into a message group composed of short message 1 and short message 2, and the group of short messages is delivered to the mobile station. The SMSC schedules the group of short messages in a transaction mode, ensuring the group of short messages can be sent continuously in a predetermined time or under predetermined conditions; even if a certain short message of the group is sent unsuccessfully, the SMSC will resend the message in a very short time.

8. Only after having sent the whole group of short messages to the mobile station, the SMSC returns a processing result of the present short message transaction to the PPG/WAP GW through a Submission Acknowledgement Message.

9. The PPG/WAP GW sends a Result Notify Request to the SP.

10. The SP returns a Result Notify Response.

11. After the mobile station has acknowledged the Push content, the mobile phone activates the GPRS network and extracts the corresponding information content on the appointed Uniform Resource Locator (URL).

12. The WAP GW forwards a request to the SP according to the URL.

13. The SP accepts the request, and the content server returns the information content to the PPG/WAP GW.

14. The PPG/WAP GW forwards the information content to the mobile station so as to accomplish the Push service.

In the above flow, when the SMSC schedules the short message group in the transaction mode, if, in the predetermined time or under the predetermined conditions, one or more messages of the group are delivered unsuccessfully, the SMSC returns a submission failure result to the PPG/WAP GW, the PPG/WAP GW forwards the failure result to the SP, and the flow ends.

In the invention, a WAP Push service can be born by arranging a special SMSC which specially takes charge of the bearing of a Push service, or part of the resources of the SMSC is reserved to specially process a Push service. Thus, the WAP GW/PPG can obtain a real-time processing result of the present WAP Push transaction and resend the failed WAP Push, which reduces the end-to-end time delay and thereby further improves the success rate of a WAP Push message. The SMSC can be arranged separately or integrated in a WAP GW system.

The invention claimed is:

1. A method for implementing a Push service, the method comprising:

a Push Initiator sending a Push message to a Short Message Service Center through a Push Proxy Gateway (PPG);

the Short Message Service Center segmenting the Push message to obtain a group of short messages, and scheduling the group of short messages in a transaction mode and delivering them to a mobile station, wherein said transaction mode refers to continuously sending in a predetermined time a group of short messages obtained by segmenting, and resending one or more one of the messages when they are sent unsuccessfully;

wherein the group of short messages are recombined by the mobile station after being received by the mobile station, and if all the short messages of the group obtained by segmenting are sent to the mobile station successfully in a predetermined time, the Short Message Service Center (SMSC) returns only a single Acknowledgement Message, which is prepared by the SMSC in response to receiving a submission of the Push message from the PPG, to the PPG to inform the PPG that the Push message has been sent to the mobile station successfully, and the PPG sends a Result Notify Message to the Push Initiator according to the Acknowledgement Message;

if any one of the short messages of the group obtained by segmenting is sent unsuccessfully in a predetermined time, the Short Message Service Center returns only a single Submission Failure Message, which is prepared by the SMSC in response to receiving the submission of the Push message from the PPG, to the PPG to inform the PPG that the Push message has not been sent to the mobile station successfully, and the PPG sends a Result Notify Message to the Push Initiator according to the Submission Failure Message; and wherein after sending the Push message to the Short Message Service Center, the PPG suspends the present transaction to wait for the processing result thereof from the Short Message Service Center and continues to process the next transaction.

2. The method according to claim 1, wherein said Short Message Service Center is specially used to bear a Push service.

3. The method according to claim 2, wherein said SMSC is arranged separately or integrated in a WAP Gateway.

* * * * *